United States Patent
Klaus et al.

(10) Patent No.: US 8,506,027 B2
(45) Date of Patent: Aug. 13, 2013

(54) THERMOPLASTIC REFRIGERATION APPLIANCE HANDLE WITH OVERMOLDED INSERTS

(75) Inventors: Bernhard Thomas Klaus, Taylorsville, KY (US); Robert Dennis Halleron, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/893,285

(22) Filed: Sep. 29, 2010

(65) Prior Publication Data
US 2012/0074826 A1    Mar. 29, 2012

(51) Int. Cl.
| A47B 96/04 | (2006.01) |
| A47B 95/02 | (2006.01) |
| B25G 1/10  | (2006.01) |
| A45C 3/00  | (2006.01) |
| A45C 7/00  | (2006.01) |
| A45C 13/22 | (2006.01) |
| A45C 13/26 | (2006.01) |
| A45F 5/10  | (2006.01) |
| A47J 45/00 | (2006.01) |

(52) U.S. Cl.
USPC ............. 312/405; 312/348.6; 16/412; 16/436

(58) Field of Classification Search
USPC ........ 16/412, 436; 312/405, 405.1, 326–329, 312/340.6, 348.6, 244
See application file for complete search history.

(56) References Cited

U.S. PATENT DOCUMENTS

| 1,611,549 | A | * | 12/1926 | Moore | 292/347 |
|---|---|---|---|---|---|
| 2,149,375 | A | * | 3/1939 | Wiebe | 292/347 |
| 2,175,632 | A | * | 10/1939 | Maga | 16/422 |
| 2,244,977 | A | * | 6/1941 | Hansman et al. | 411/524 |
| 2,329,767 | A | * | 9/1943 | Jakeway | 16/419 |
| 2,345,371 | A | * | 3/1944 | Amrine | 16/444 |
| 2,355,978 | A | * | 8/1944 | Keeler | 16/412 |
| 2,530,303 | A | * | 11/1950 | Keeler et al. | 292/347 |
| 2,632,540 | A | * | 3/1953 | Smith | 192/46 |
| 3,393,423 | A | * | 7/1968 | Adams | 16/444 |
| 3,606,415 | A | * | 9/1971 | Friedling et al. | 403/403 |
| 3,766,598 | A | * | 10/1973 | Roberts | 16/444 |
| 4,087,141 | A | * | 5/1978 | Roberts | 312/348.6 |
| 4,127,353 | A | * | 11/1978 | Busse | 403/245 |
| 4,138,765 | A | * | 2/1979 | Yamazaki et al. | 16/412 |
| 4,357,734 | A | * | 11/1982 | Moore | 16/442 |
| 4,545,698 | A | * | 10/1985 | Koch | 403/231 |
| 4,926,523 | A | * | 5/1990 | Carlson et al. | 16/412 |
| 4,938,624 | A | * | 7/1990 | Johnson et al. | 403/195 |

(Continued)

FOREIGN PATENT DOCUMENTS
JP    2003213973 A  *  7/2003

*Primary Examiner* — Darnell Jayne
*Assistant Examiner* — Kimberley S Wright
(74) *Attorney, Agent, or Firm* — Dority & Manning, P.A.

(57) ABSTRACT

A door handle configured for mounting onto a surface of an appliance door, such as a refrigerator door, includes a thermoplastic molded body having a central grip section intermediate of a mounting foot provided at each opposite end of the body. Each mounting foot has a flat planar cross-sectional end face configured for mounting flush against the surface of the appliance. A tubular metal insert is overmolded in each mounting foot, with the insert having an open end generally flush with the mounting foot end face. The insert has an inner cross-sectional profile configured for engagement over a stud provided on the surface of the appliance with, for example, a setscrew inserted through a setscrew hole.

16 Claims, 5 Drawing Sheets

(56) References Cited

U.S. PATENT DOCUMENTS

| | | | | |
|---|---|---|---|---|
| 5,303,451 | A | 4/1994 | Graviss et al. | |
| 5,308,574 | A * | 5/1994 | Yamazaki et al. | 264/572 |
| 5,797,164 | A * | 8/1998 | Donaghy | 16/412 |
| 6,430,780 | B1 * | 8/2002 | Kim et al. | 16/412 |
| 6,546,597 | B2 | 4/2003 | Atalla et al. | |
| 6,668,424 | B1 * | 12/2003 | Allen et al. | 16/444 |
| 6,826,804 | B2 * | 12/2004 | Zaidman | 16/436 |
| 6,959,480 | B2 * | 11/2005 | Wing et al. | 29/525.02 |
| D537,849 | S * | 3/2007 | Wong et al. | D15/89 |
| D552,959 | S * | 10/2007 | Gilboe | D8/317 |
| 7,458,133 | B2 * | 12/2008 | Wing | 16/412 |
| 7,549,713 | B2 * | 6/2009 | Gose et al. | 312/405 |
| D618,774 | S * | 6/2010 | Bauer et al. | D23/304 |
| 7,793,388 | B2 * | 9/2010 | Wing | 16/412 |
| 7,849,563 | B2 * | 12/2010 | Wing | 16/412 |
| 2002/0184734 | A1 * | 12/2002 | Atalla et al. | 16/110.1 |
| 2006/0200948 | A1 * | 9/2006 | Steurer | 16/412 |
| 2008/0034553 | A1 * | 2/2008 | Wing | 16/412 |
| 2008/0127458 | A1 * | 6/2008 | Ramsauer | 16/412 |
| 2010/0005631 | A1 * | 1/2010 | Drach et al. | 16/436 |

* cited by examiner

THERMOPLASTIC REFRIGERATION APPLIANCE HANDLE WITH OVERMOLDED INSERTS

FIELD OF THE INVENTION

The present subject matter relates generally to a handle, and more particularly to thermoplastic handle particularly suited for refrigeration appliances.

BACKGROUND OF THE INVENTION

Gas assist thermoplastic molding techniques have enabled the production of aesthetically pleasing and, if desired, "soft-feel" appliance handles, particularly elongated refrigerator door handles. Customers have shown a preference for the textures, shapes, and feel of these handles. However, the plastic handle material is generally not suitable for direct attachment of the handle to the refrigerator door. The attachment location is a crucial design criterion and must provide for a strong and reliable securement juncture between the door and the handle.

Conventional handle attachment devices include slide-on mechanisms wherein brackets are attached to the refrigerator door. Complimentary engaging members are provided at the ends of the handle, which is then slid onto and secured to the brackets. This method requires numerous components and a relatively large attachment footprint on the face of the refrigerator door, which is not suitable for the relatively slender and sleek design of gas assist handles.

Another conventional attachment design entails the use of a fastener (i.e., bolt, screw, or the like) directly through the front of the handle to engage the refrigerator door. This method requires use of a cap or plug separately applied to the front of the handle to hide the through-hole and fastener from sight. The caps are visible, tend to collect dirt and debris, and again are generally not compatible with the more sophisticated look of the gas assist thermoplastic handles.

Other conventional handle attachment systems include metal handles (i.e., painted stainless steel handles) having inserts pressed into the mounting feet sections of the handle. The inserts mount onto door studs. These handles are prone to deterioration of the paint and loosening of the insert over time. Another method involves overmolding an aluminum sleeve into a piece of plastic, with the plastic piece subsequently pressed into a stainless steel handle shell.

U.S. Pat. No. 6,546,597 describes a gas assist refrigerator handle having a hollow grip portion and solid distal ends. Metal inserts are completely encased in the solid ends to reinforce the handle where it attaches to the side panel of the refrigerator door with bolts that pass through a section of the handle that abuts the side panel.

U.S. Pat. No. 5,303,451 describes a refrigerator door handle that includes an elongated stiffener member in the form of a channel having a plurality of apertures along its length. An elastomer is injected molded around the stiffener member and flows through the apertures and into the stiffener member. The stiffener member includes an attachment foot at the ends thereof with slots to receive screws for attaching the handle to the refrigerator door.

The attachment devices and handle configurations discussed above are not particularly well suited for attachment of substantially hollow gas assist thermoplastic door handles to the front panel of a refrigerator door.

Accordingly, it would be desirable to provide a gas assist thermoplastic refrigerator door that incorporates a secure and reliable attachment device without multiple handle sections or molding steps, and without detracting from the aesthetics of the handle.

BRIEF DESCRIPTION OF THE INVENTION

Aspects and advantages of the invention will be set forth in part in the following description, or may be obvious from the description, or may be learned through practice of the invention.

In an exemplary embodiment, a door handle is provided for mounting onto a surface of an appliance, for example to a door of a refrigeration appliance such as a refrigerator or freezer. The handle includes a thermoplastic molded body, which may be a gas-assist molded component, a central grip section and opposite mounting feet at the ends of the body. Each mounting foot has a flat, planar cross-sectional end face configured for mounting flush against the surface of the appliance. A tubular metal insert is overmolded in each mounting foot. The insert has an open end generally flush with the mounting foot end face and an inner cross-sectional profile configured for engagement over a stud (or other mounting protrusion) provided on the surface of the appliance. A set-screw aperture is defined through the mounting foot and into the insert for mounting the handle onto the studs.

In additional embodiments, an appliance is provided having one or more of the handles discussed above. The appliance may be, for example, a refrigerator, a freezer, or any other manner of household appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
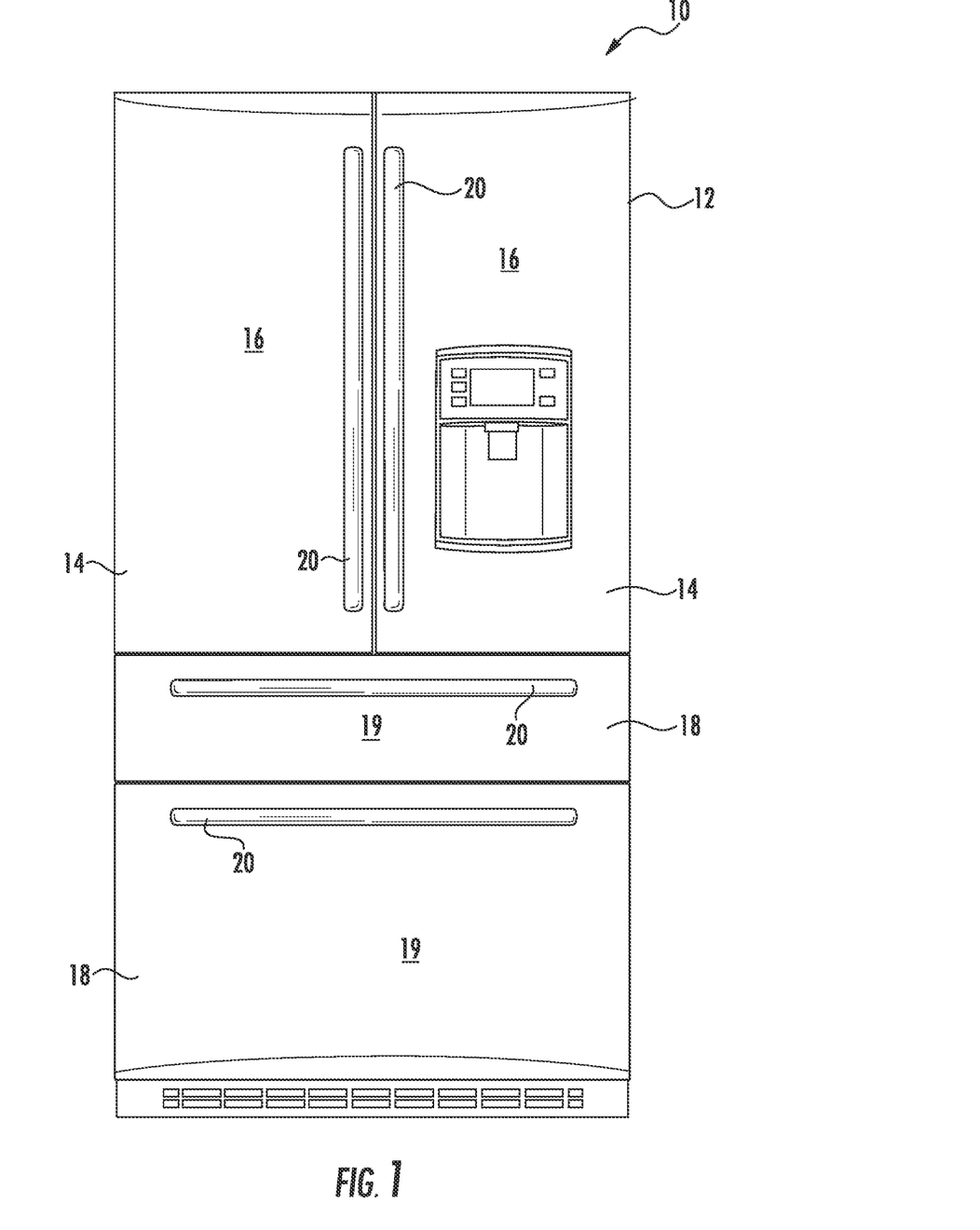
FIG. 1 is a perspective view of a refrigeration appliance (e.g., a refrigerator) having a number of handles for the various compartment doors.

FIG. 1 is a perspective view of an exemplary refrigeration appliance 10 depicted as an upright refrigerator having a cabinet or casing 12 that defines a number of internal storage compartments. In particular, the refrigerator 10 includes upper fresh-food compartments having doors 14 and lower freezer compartments having doors 18. The doors 14 have a front surface 16, and the doors 18 have a front surface 19. Handles 20 are mounted to the respective doors. The refrigerator depicted in FIG. 1 is conventional style, and is not unique to the present invention. It should be readily appreciated that the handles 20 in accordance with the present invention are not limited to any particular type of appliance 10, and that the refrigerator depicted in FIG. 1 is for illustrative purposes only. Handles 20 according to the present invention may be used with any type of refrigeration appliance, such as a freezer, refrigerator/freezer combination, any type or model of conventional refrigerator, and so forth.

Figure 2:
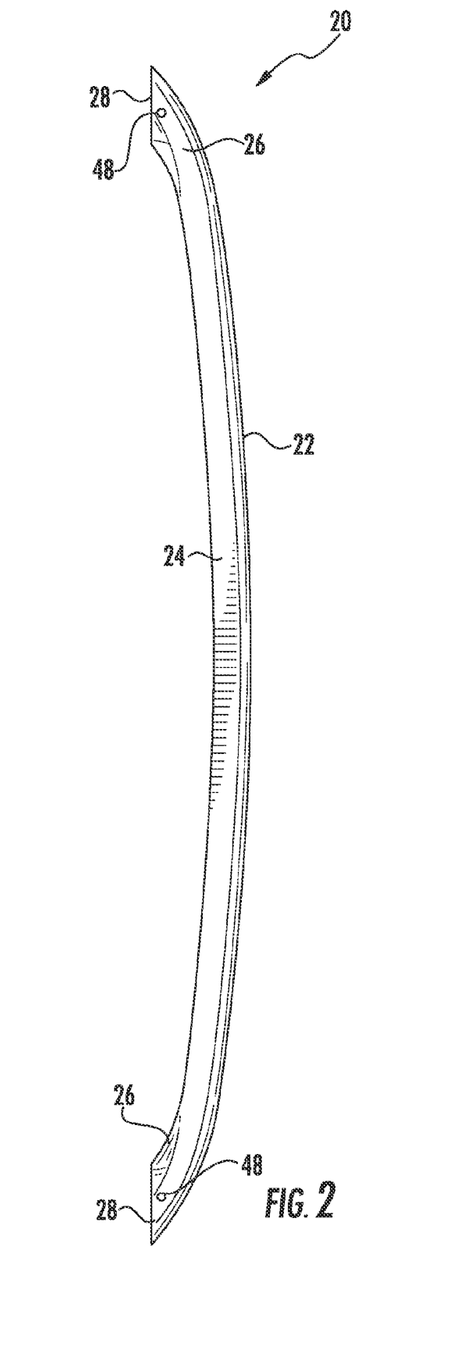
FIG. 2 is a side view of an appliance door handle in accordance with aspects of the invention.
Figure 3:
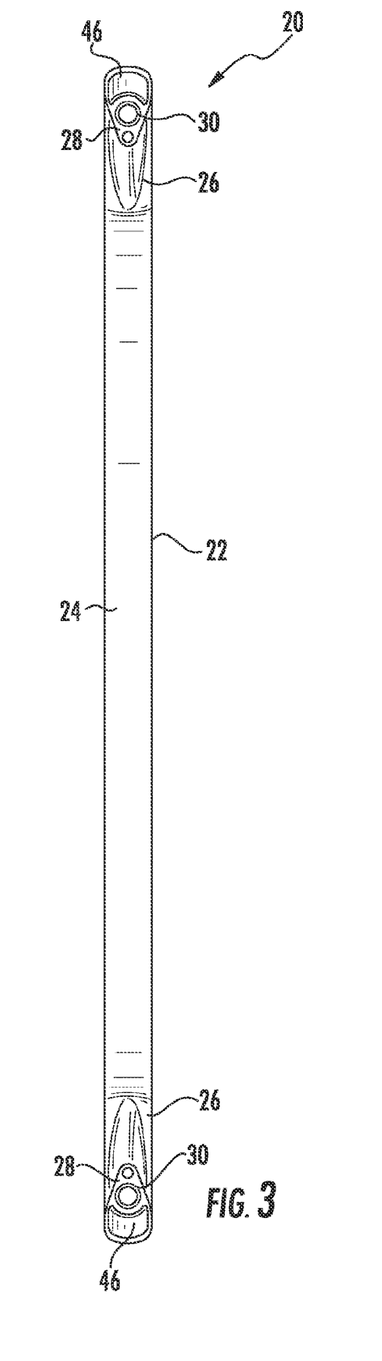
FIG. 3 is a underside view of the handle of FIG. 2.

Referring to FIGS. 1 through 3, the handles 20 are generally elongated molded plastic devices having a body 22. The body 22 includes a central grip section 24 and mounting feet 26 at opposite ends of the body 22. As depicted in FIG. 1, the handles 20 may be oriented in a vertical position or a horizontal position depending on the particular door configuration for the appliance 10.

The body 22 of the handles 20 may be a thermoplastic component that is molded in a gas-assist injection molding process. Gas assist injection molding is a technique that is well known by those skilled in the art and need not be described in detail herein. In general, gas assist injection molding is a process that utilizes an inert gas to create one or more hollow channels or spaces within an injection-molded plastic part. At the end of the thermoplastic filling state, the gas is injected into the liquid core of the molding such that thick molten sections of the thermoplastic are replaced with gas-filled channels. The gas is under sufficient pressure to essentially pack the molten plastic into and against the mold cavity surfaces. This process compensates for shrinkage of the plastic until the molded part solidifies. The gas is then vented from the mold. Gas assist injection molding allows for relatively inexpensive yet detailed injection molded components and is particularly useful in providing a refrigerator handle 20 having a sleek profile and central grip section 24 that is appealing to many users. Although gas-assist injection molding is a preferred technique, other conventional molding processes are within the scope and spirit of the invention.

Figure 7:
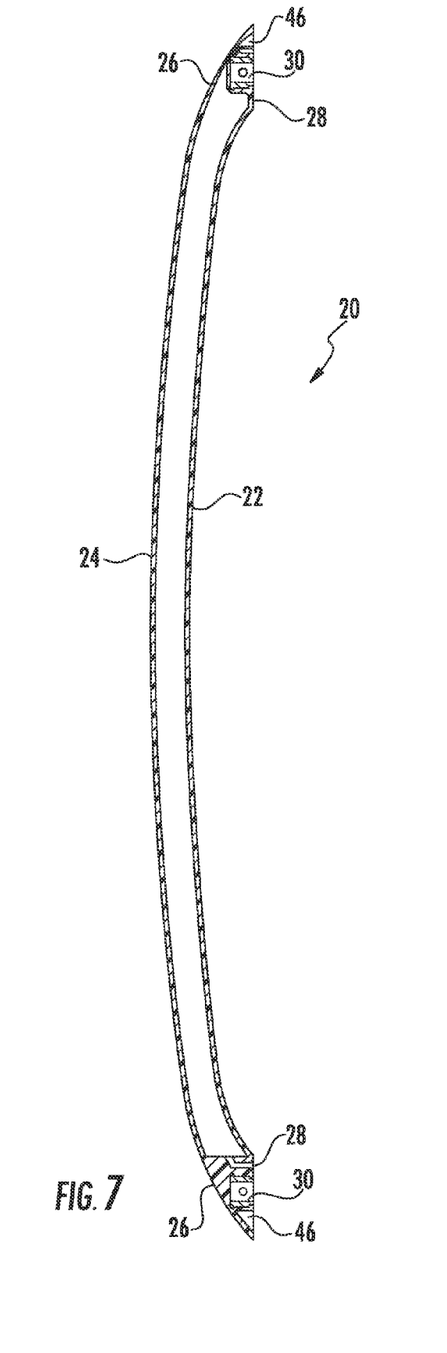
FIG. 7 is a longitudinal cross-sectional view of the handle of FIG. 2.

FIG. 7 depicts a handle 20 in cross-section. The central grip section 24 of the body 22 is essentially hollow as a result of the gas assist injection molding process. Depending on the type of material and thickness of the handle wall, the central grip section may be made to have a relatively "hard" (non-pliant) feel or a relatively pliant or soft feel when grasped by a consumer to open the appliance door.

Referring to the figures in general, the handle 20 includes a mounting foot 26 at the opposite ends of the body 22, as mentioned above. The mounting feet 26 has a generally flat planar cross-sectional end face 28 that is configured for mounting flush against the front surfaces 16, 19 of the respective doors 14, 18.

A tubular metal insert 30 is over-molded in each mounting foot 26. The insert 30 is completely surrounded by the thermoplastic material in the mounting foot 26 and has an open end 32 defined by an exposed end face 35 that is generally flush with the mounting foot end face 28, as particularly illustrated in FIG. 8. The insert 30 has an opposite end 34 that is closed by the over-molded thermoplastic material in the foot 26.

The insert 30 is a generally cylindrical member having a body 33 between the opposite ends 32, 34. The body 33 has an inner diameter cross-sectional profile that is configured for engagement over a stud or projection protruding from the front surfaces 16, 19 of the doors 14, 18. A setscrew aperture 36 is defined through the body 33 and aligns with a setscrew hole 48 defined in a side of the handle body 22, as depicted in FIG. 2.

To attach the handle 22 to the surface of the appliance doors, the mounting feet 26 are positioned so that the inserts 30 slide onto the stud or other projections on the door. A setscrew is then engaged with the stud through the aligned openings 48, 36 to securely attach the mounting feet 26 to the appliance doors 14, 18.

Figure 4:
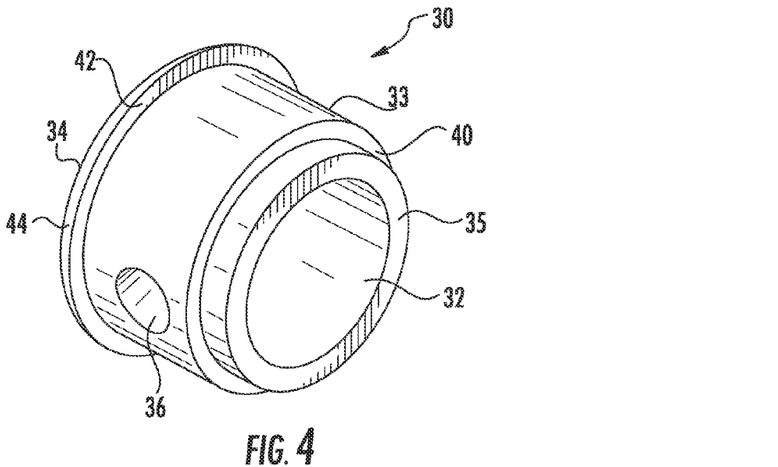
FIG. 4 is a perspective view of an insert that is overmolded into the mounting feet of the handle of FIG. 2.
Figure 5:
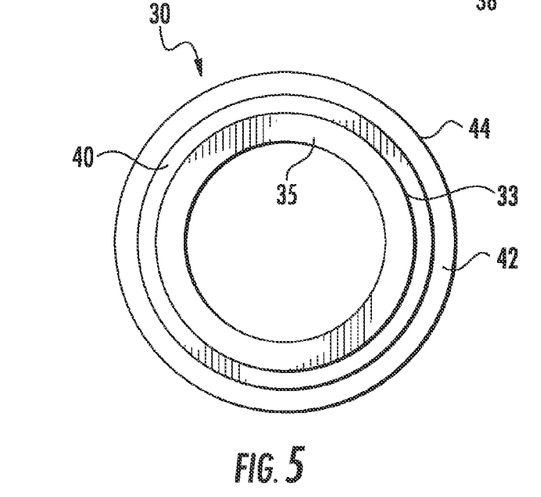
FIG. 5 is an end view of the insert of FIG. 4.
Figure 6:
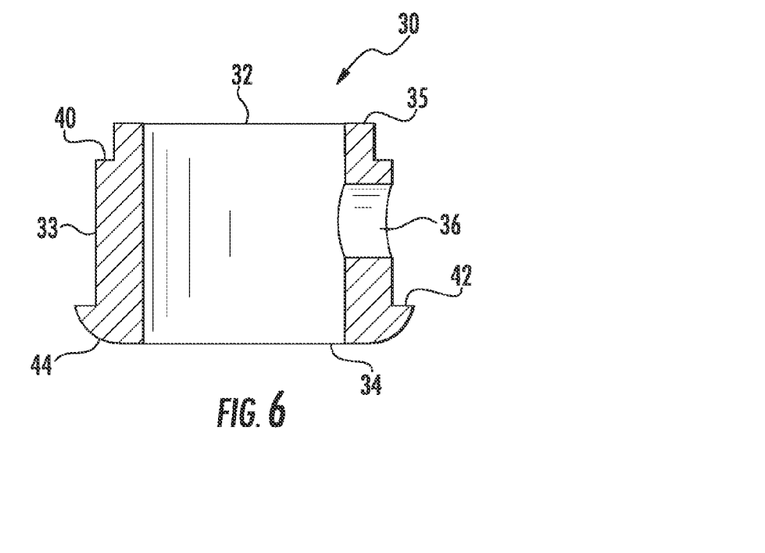
FIG. 6 is a cross-sectional view of the insert of FIG. 4.

Referring particularly to FIGS. 4 through 6, the metal insert 30 includes an outer circumferential surface that is contoured for enhancing retention of the insert 30 within the mounting foot 26. In the illustrated embodiment, the outer circumferential surface of the insert 30 includes an increasing diameter from the open end 32 to the opposite end 34. The increasing diameter may be defined by a number of discrete steps, such as steps 40 and 42 depicted in the figures. In an alternate embodiment, the increased diameter may be gradual or irregular. In addition, any other manner of grip-enhancing contour or projection may be provided on the outer circumferential surface of the body 33 to enhance retention of the insert 30 within the mounting foot 26. In the embodiment depicted in the figures, the final mounting step 42 defines a curved lip 44 at the opposite end 34.

Figure 8:
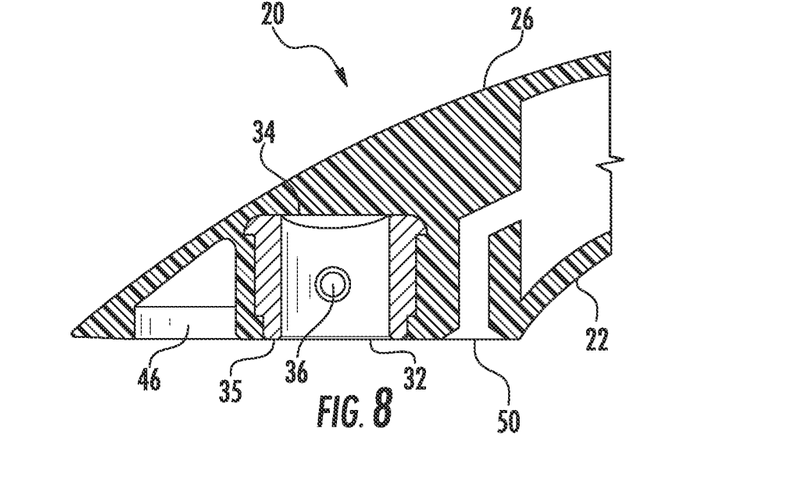
FIG. 8 is a cross-sectional view of a mounting foot of the handle of FIG. 2.
Figure 9:
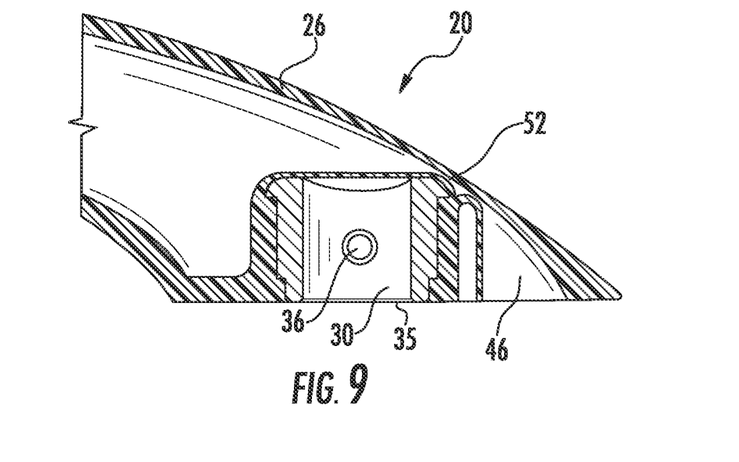
FIG. 9 is a cross-sectional view of the opposite mounting foot of the handle of FIG. 2.

As particularly seen in FIGS. 7 through 9, the mounting feet 26 contain a substantially greater amount of the thermoplastic material to provide added rigidity and strength at the location where the handle 22 mounts to the appliance door. As described, the inserts 30 are completely over-molded into the substantially solid feet 26, with the possible exception of the exposed end face 35. Referring to FIGS. 7 through 9, the mounting feet 26 may include relatively small ports or passages 50, 52 for injection and exit of the pressurized molding gas used in the gas-assist molding process. These ports 50, 52 do not detract from the rigidity of the mounting feet 26. FIG. 8 (and the lower foot 26 in FIG. 7) illustrates a relatively well defined injection port 50 wherein the pressurized gas is introduced. FIG. 9 (and the upper foot 26 in FIG. 7) illustrates the gas exit path 52 as a relatively small passage between the lip 44 of the insert 30 and the wall of the handle 20. From this point, the gas exits into a recess 46. It should be readily appreciated that the handle 20 is not limited to any particular location, size, or orientation of the entry and exit points for the pressurized gas in the gas-assist molding process.

It may also be desired, to provide a recess 46 within the foot 26 generally at the outer aspect of the end face 28. This recess 46 serves to remove excess material from the foot 26 and to prevent sink marks. The recess 46 also provides a location to gate the mold and exit gas during the molding process. The recess 46 may also provide a degree of flexibility to the feet 26 to assist in the mounting process wherein the inserts 30 are mounted onto studs or other projections on the appliance doors.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A door handle configured for mounting onto a surface of an appliance, comprising:
    a gas-assist thermoplastic molded body having a central grip section intermediate of a mounting foot provided at each opposite end of said body, said central grip section being substantially hollow such that said central grip portion defines a channel therein;
    at least one mounting foot of said molded body having a flat planar cross-sectional end face oriented relative to said body for mounting flush entirely against a front surface of the appliance, the at least one mounting foot of said molded body defining a passage between said mounting foot end face and the channel of said central grip portion, the passage of the at least one mounting foot of said molded body configured for permitting a flow of pressurized molding gas therethrough; and
    a tubular metal insert overmolded in the at least one mounting foot of said molded body such that said insert is retained within the at least one mounting foot of said molded body by thermoplastic body material molded around at least a portion of said inert, a gas exit recess formed into said mounting foot end face between said insert and an extreme end of the at least one mounting foot of said molded body;
    said insert having an open end generally flush with said mounting foot end face such that said mounting foot end face and insert mount flush entirely onto the front surface of the appliance, said insert having an inner cross-sectional profile configured for engagement over a stud provided on the front surface of the appliance;
    wherein said insert comprises a contoured outer circumferential surface for enhanced retention in the at least one mounting foot of said molded body, said outer circumferential surface comprises an increasing diameter from said open end to an opposite end;
    wherein said increasing diameter is defined in a plurality of incremental steps, the passage of the at least one mounting foot of said molded body positioned between the opposite end of said insert and a wall of the at least one mounting foot of said molded body;
    wherein the at least one mounting foot of said molded body and said insert define a setscrew aperture therethrough.

2. The door handle as in claim 1, wherein said body comprises a front side and opposite side surfaces, said set screw aperture defined in one of said side surfaces transverse to a longitudinal axis of said insert.

3. The door handle as in claim 1, wherein said handle is configured as a refrigeration appliance handle.

4. The door handle as in claim 1, wherein said insert comprises a generally cylindrical member.

5. The door handle as in claim 1, further comprising a setscrew received within said setscrew aperture, said setscrew configured for engaging the stud provided on the front surface of the appliance in order to attach the at least one mounting foot of said molded body to the appliance.

6. The door handle as in claim 5, wherein said molded body defines a setscrew hole aligned with said setscrew aperture, said setscrew received within the setscrew hole of said molded body in order to attach the at least one mounting foot of said molded body to the appliance.

7. The door handle as in claim 1, wherein a final mounting step of the plurality of incremental step defines a curved lip, the curved lip positioned proximate the opposite end of the insert.

8. The door handle as in claim 1, wherein said insert is surrounded by thermoplastic material of the at least one mounting foot of said molded body except for the open end of said insert that defines an exposed end face.

9. An appliance, comprising:
    a cabinet defining an interior volume;
    a door mounted to said cabinet, said door having a front surface;
    an elongated handle attached to said front surface of said door, said handle comprising
        a gas-assist thermoplastic molded body having a central grip section intermediate of a mounting foot provided at each opposite end of said body, said central grip section being substantially hollow such that said central grip portion defines a channel therein;
        at least one mounting foot of said molded body having a flat planar cross-sectional end face oriented relative to said body for mounting flush entirely against said front surface of said door, the at least one mounting foot of said molded body defining a passage between said mounting foot end face and the channel of said central grip portion, the passage of the at least one mounting foot of said molded body configured for permitting a flow of pressurized molding gas therethrough;
        a tubular metal insert overmolded in the at least one mounting foot of said molded body such that said insert is retained within the at least one mounting foot of said molded body by thermoplastic body material molded around at least a portion of said inert, said insert having an open end generally flush with said mounting foot end face such that said mounting foot end face and insert mount flush entirely onto said front surface of said door, said insert having an inner cross-sectional profile configured for engagement over a stud protruding from said front the surface of said door, a gas exit recess formed into said mounting foot end face between said insert and an extreme end of the at least one mounting foot of said molded body; and
        a setscrew aperture defined through the at least one mounting foot of said molded body and said insert;
        wherein said insert comprises a contoured outer circumferential surface for enhanced retention in the at least one mounting foot of said molded body, said outer circumferential surface comprises an increasing diameter from said open end to an opposite end;
    wherein said increasing diameter is defined in a plurality of incremental steps, the passage of said the at least one mounting foot of said molded body positioned between the opposite end of said insert and a wall of said molded body.

10. The appliance as in claim 9, wherein said body comprises a front side and opposite side surfaces, said set screw aperture defined in one of said side surfaces transverse to a longitudinal axis of said insert.

11. The appliance as in claim 9, wherein said appliance is a refrigeration appliance.

12. The appliance as in claim 9, wherein said insert comprises a generally cylindrical member.

13. The appliance as in claim 9, further comprising a setscrew received within said setscrew aperture, said setscrew configured for engaging the stud protruding from said front the surface of said door in order to attach the at least one mounting foot of said molded body to the door.

14. The appliance as in claim 13, wherein said molded body defines a setscrew hole aligned with said setscrew aperture, said setscrew received within the setscrew hole of said molded body in order to attach the at least one mounting foot of said molded body to the door.

15. The appliance as in claim 9, wherein a final mounting step of the plurality of incremental step defines a curved lip, the curved lip positioned proximate the opposite end of the insert.

16. The appliance as in claim 9, wherein said insert is surrounded by thermoplastic material of the at least one mounting foot of said molded body except for the open end of said insert that defines an exposed end face.

\* \* \* \* \*